(12) United States Patent
Guralnik et al.

(10) Patent No.: US 9,594,929 B2
(45) Date of Patent: Mar. 14, 2017

(54) OPEN ARCHITECTURE SECURITY METHODS AND SYSTEMS

(71) Applicant: Honeywell International Inc., Morristown, NJ (US)

(72) Inventors: Valerie Guralnik, Mound, MN (US); Siva Raj Rajagopalan, Chandler, AZ (US)

(73) Assignee: Honeywell International Inc., Morris Plains, NJ (US)

(*) Notice: Subject to any disclaimer, the term of this patent is extended or adjusted under 35 U.S.C. 154(b) by 51 days.

(21) Appl. No.: 14/456,699

(22) Filed: Aug. 11, 2014

(65) Prior Publication Data

US 2016/0042174 A1  Feb. 11, 2016

(51) Int. Cl.
*G06F 21/44* (2013.01)
*G06F 21/73* (2013.01)
*G06F 21/74* (2013.01)
*G06F 21/85* (2013.01)

(52) U.S. Cl.
CPC .............. *G06F 21/73* (2013.01); *G06F 21/74* (2013.01); *G06F 21/85* (2013.01)

(58) Field of Classification Search
CPC ......... G06F 2221/2113; G06F 21/6218; G06F 21/121; G06F 21/577; G06F 21/00; G06F 21/44; G06F 21/70; G06F 21/73; G06F 21/74; G06F 21/85; H04L 63/126
See application file for complete search history.

(56) References Cited

U.S. PATENT DOCUMENTS

| | | | | |
|---|---|---|---|---|
| 7,676,843 B1* | 3/2010 | Stott | ...................... | G06F 21/51 726/2 |
| 7,774,620 B1* | 8/2010 | Stott | ...................... | G06F 21/51 380/59 |
| 8,239,915 B1* | 8/2012 | Satish | ..................... | G06F 21/00 713/166 |
| 8,407,783 B2* | 3/2013 | Huang | ................... | G06F 21/62 713/192 |
| 8,601,170 B1* | 12/2013 | Marr | ..................... | G06F 21/572 710/15 |
| 9,178,897 B2* | 11/2015 | Bush | ....................... | G06F 21/00 |
| 2002/0073328 A1* | 6/2002 | Daniels | ............... | G06F 21/6218 726/27 |
| 2004/0064723 A1* | 4/2004 | Barnes | ................ | G06F 12/1491 726/1 |
| 2005/0114687 A1* | 5/2005 | Zimmer | .............. | G06F 12/1425 713/193 |
| 2005/0278790 A1* | 12/2005 | Birk | ........................ | G06F 21/54 726/26 |
| 2008/0282319 A1* | 11/2008 | Fontijn | ................... | G06F 21/53 726/1 |
| 2009/0249448 A1* | 10/2009 | Choi | ................... | H04L 63/0815 726/4 |

(Continued)

*Primary Examiner* — Catherine Thiaw
(74) *Attorney, Agent, or Firm* — Brooks, Cameron & Huebsch, PLLC (57) ABSTRACT

Devices, methods, systems, and computer-readable media for open architecture security are described herein. One or more embodiments include a method for open architecture security, comprising: identifying a source of a received computing component, assigning a value to the received computing component based on the source, and designating the received computing component into a security level based on the assigned value.

16 Claims, 3 Drawing Sheets

(56) References Cited

U.S. PATENT DOCUMENTS

| | | | | |
|---|---|---|---|---|
| 2009/0254993 A1* | 10/2009 | Leone | ............... | G06F 21/51 |
| | | | | 726/25 |
| 2010/0132015 A1* | 5/2010 | Lee | ............... | G06F 21/57 |
| | | | | 726/3 |
| 2010/0169667 A1* | 7/2010 | Dewan | ............... | G06F 21/57 |
| | | | | 713/193 |
| 2011/0141124 A1* | 6/2011 | Halls | ............... | G06F 21/83 |
| | | | | 345/522 |
| 2013/0055347 A1* | 2/2013 | Chawla | ............... | H04W 12/08 |
| | | | | 726/3 |
| 2014/0052971 A1* | 2/2014 | Sehr | ............... | G06F 9/30003 |
| | | | | 712/227 |
| 2014/0230008 A1* | 8/2014 | Feroz | ............... | H04L 63/20 |
| | | | | 726/1 |
| 2014/0344936 A1* | 11/2014 | Thario | ............... | G06F 21/577 |
| | | | | 726/25 |
| 2015/0150085 A1* | 5/2015 | Joshi | ............... | H04W 12/08 |
| | | | | 726/3 |
| 2015/0161021 A1* | 6/2015 | Yeo | ............... | G06F 11/30 |
| | | | | 702/189 |
| 2015/0370302 A1* | 12/2015 | Mudusuru | ............... | G06F 1/30 |
| | | | | 711/103 |

* cited by examiner

OPEN ARCHITECTURE SECURITY METHODS AND SYSTEMS

TECHNICAL FIELD

The present disclosure relates to methods, devices, system, and computer-readable media for open architecture security.

BACKGROUND

Devices such as computing devices can utilize an open architecture platform. The open architecture platform can utilize a plurality of products from trusted and non-trusted entities. For example, the plurality of products can include computing components that can be executed by the computing devices. The computing components can include software, firmware, and/or hardware that can be utilized by the computing devices. In some embodiments, an open architecture platform can be vulnerable to cyber security threats.

DETAILED DESCRIPTION

Devices, methods, systems, and computer-readable media for open architecture security are described herein. For example, one or more embodiments include a method for open architecture security, comprising: identifying a source of a received computing component, assigning a value to the received computing component based on the source, and designating the received computing component into a security level based on the assigned value.

In some embodiments, an open architecture platform that is utilized by a controller can be vulnerable to cyber security threats. For example, an open architecture platform on a controller can be vulnerable to cyber security attacks due to an inability to restrict the actions installed components can take during run-time. In another example, an open architecture platform on a controller can be vulnerable to cyber security attacks due to an inability to authenticate the source of input that is being used to make run-time decisions. Described herein are systems and methods for preventing cyber threat attacks in an open architecture platform on a controller.

As used herein, a controller is a device that can manage a number of other devices and/or software. For example, as used herein, a controller can be a network controller that manages a network. There can be specific problems associated with providing security for a controller utilizing an open architecture platform. For example, the controller can have a plurality of users accessing the same controller. In this example, the controller can communicate with a plurality of unsecure users. As used herein, the users can include other computing devices, network switches, and/or human users, among other users that can interact with the controller.

The plurality of users that are communicating with the controller can each have a varying level of trust based on the particular user. Each of the plurality of users can also have different interactions with the controller. For example, a user can interact with the controller via an internet connection with the controller. In another example, a user can be a "regular" user that has restricted access to only utilize applications on the controller, but is restricted from accessing the operating system of the controller. Providing security for an open architecture platform on a controller can include identifying the user (e.g., source of the communication) and assigning a level of trust to the communication based on the source.

Open architecture security can include establishing a number of security levels for a plurality of computing components of a controller (e.g., network controller, network node, hardware based controller, software based controller, computing device utilized to manage other devices and/or software, etc.). As used herein, computing components of a controller can include applications of the controller and/or applications downloaded to the controller. The computing components can include software and/or data received by an organization (e.g., Tridium®). A security level of the computing components can be determined based on the source of the computing components as described herein. In addition, a security level of data that is received by a controller can be determined based on the source of the data as well as the computing component that received the data.

In some embodiments, each of the number of security levels can define a maximum level of privilege for computing components designated to a corresponding security level. That is, each security level can designated a level of trust and a number of privileges for computing components that are designated to each security level.

Open architecture security can also include identifying a source of a computing component that is received at a controller. The identified source can be verified (e.g., authenticated) to ensure that the computing component is authorized by the identified source. A value can be assigned to the received computing component based on a level of trust associated with the identified source. Some sources will have a relatively high level of trust associated with them and other sources will have a relatively low level of associated with them.

The assigned value can be utilized to designate the received computing component into a particular security level. That is, the received computing component and/or data can be designated to a particular security level based on the identified source of the received computing component and/or data. In some embodiments the assigned value and/or designated security level can be altered by a user and/or altered based on additional information that is received after receiving the computing component and/or data.

Controllers utilizing an open architecture platform can be more secure by designating computing components into a number of security levels compared to previous methods. In addition, open architecture security as described herein can enable a plurality of computing components to interact within the same security level, but not allow computing components to interact between different security levels. Open architecture security as described herein can provide the benefits of an open architecture platform by enabling interaction between various computing components from various sources, but also providing additional security compared to previous methods by restricting privileges of the computing components from interacting with other computing components from different security levels.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of security levels" can refer to one or more security levels. Additionally, the designator "N", as used herein, particularly with respect to reference numerals in the drawings, indicates that a number of the particular feature so designated can be included with a number of embodiments of the present disclosure.

Figure 1:
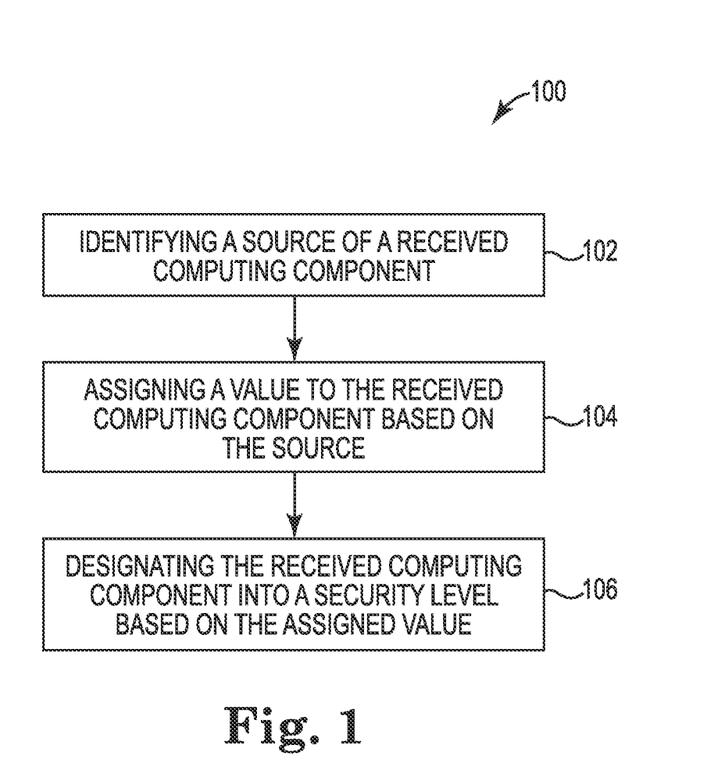
FIG. 1 is an example of a method for open architecture security according to one or more embodiments of the present disclosure.

FIG. 1 is an example of a method 100 for open architecture security according to one or more embodiments of the present disclosure. The method 100 can be utilized on controller that utilizes an open architecture platform.

As used herein, an open architecture platform includes a computing architecture, where the specifications of the computing architecture are public (e.g., published, published for public viewing, etc.). That is, an open architecture platform can include multiple developers of computing components for controllers that utilize the open architecture platform. One example of an open architecture platform for a controller can include, but is not limited to Niagara®. In some embodiments, the platform Niagara® can be operated on a device such as a JACE® controller.

As used herein, computing components can include software, firmware, and/or hardware that can be installed and/or coupled to a controller. In some embodiments, there can be an existing set of computing components installed on the controller and received computing components that are installed on the controller. The existing computing components can include computing components such as: hardware from a trusted source (e.g., manufacturer of controller, etc.), operating system from a trusted source, and/or firmware from a trusted source. For example, a controller can be manufactured with a particular combination of existing hardware, existing software that is utilized in an operating system, and/or existing firmware.

At 102, the method 100 can include identifying a source of a received computing component. In some embodiments, a controller can receive additional computing components that can be installed on and/or utilized by the controller. The received computing components can include hardware, software, firmware, and/or a combination thereof. The received computing components can be created by a particular source (e.g., developer, administrator, etc.). For example, the received computing components can be hardware, software, firmware, and/or a combination thereof that is generated and sent to the controller via a source.

Identifying the source can include identifying a number of features of the received computing component. The number of features of the received computing component can include, but is not limited to: a key (e.g., public key, private key, or a combination thereof) associated with a certificate that is utilized to sign the computing component, a method of transfer to the controller, a user identification (UID) of an author of the computing component, and/or a combination thereof.

At 104, the method 100 can include assigning a value to the received computing component based on the source. Assigning the value to the received computing component can include assigning a value to each of the number of features of the received computing component. The value that is assigned can reflect a level of trust for the received computing component. Each of the number of features can be assigned a value to determine a total value of the received computing component. The total value can be a value that is a total weighted value of all the values assigned to each of the number of features. That is, each of the values can be assigned a weight based on a level of trust for the corresponding feature. That is, a greater weight can be assigned to a feature that has a greater level of trust and the value associate with the feature can be given a greater weight when determining the total value.

In some embodiments, the total value can be a value assigned to a relatively less trusted feature of the computing component. For example, the total value can be a value assigned to the least trusted feature of the computing component.

In some embodiments, each of the number of features can include a range of values that can be assigned to each feature. The range of values can be based on a level of trust that can correspond to the respective feature. For example, a signature that is associated with the received computing component can have a relatively higher range compared to other features of the computing component. In this example, it can be determined that an authorized signature of the computing component can be a relatively higher indication of trust compared to other features of the computing component. Thus, in this example, a higher value can be assigned to computing components with an authorized signature compared to other features without an authorized signature. That is, each feature can be assigned a level of trust that can be utilized to assign the value. As described herein, a total value of a computing component can be assigned based on a feature with a relatively lower trust level.

Assigning the value to the received computing component can also include assigning a value to a combination of features associated with the received computing component. In some embodiments, assigning a value to a combination of features can include assigning a value to particular combinations that provide a greater indication that the received computing component was received by a particular source. For example, a combination of features that provides a greater indication that the received computing component was generated and/or received by a source. In this example, the combination can include a certificate from the source, a user name and password of the source, MAC address of a device of the source, and/or an IP address that corresponds to the source.

Assigning a value to the computing component can include assigning a value to the computing component based on the source. For example, a first value can be assigned to a computing component that is received from a first source and a second value that is greater than the first value can be assigned to a computing component that is received from a second source. That is, it can be determined that the second source is a more trusted source compared to the first source and a greater value can be assigned to the second source. The value assigned to the received computing component can be utilized to designate each of the computing components for a controller into a number of different security levels as described further herein.

In some embodiments, data that is received at a controller can also be assigned a value that indicates a security level. Similar to assigning a value to the computing component, a value can be assigned to the received data by identifying the source of the data and assigning a value to the data based on the source. In addition, a value can be assigned to the received based, at least in part, on the computing component that received the data. That is, the security level of the computing component that received the data can be utilized to determine a value and/or security level of the data. In some embodiments, the data that is received is from a physically connected source (e.g., via a serial connection). Data that is received from a physically connected source can be determined to have a relatively higher level of trust compared to data that is received from a source that is not physically connected to the controller and/or device (e.g., Ethernet, etc.).

At 106, the method 100 can include designating the received computing component into a security level based on the assigned value. Designating the received computing component into a security level can include designating an execution procedure for the computing component during run time.

The execution procedure can include a number of resources of the controller that the computing component is capable of accessing during run-time. For example, the execution procedure can include data and a number of interfaces by other computing components (e.g., networking computing components, etc.). The data of the number of resources can include persistent data, such as parts of a file system and/or non-persistent data such as run-time memory. In some embodiments, the execution procedure can include specific computing components that are acceptable to interact with during run-time. As used herein, acceptable computing components can include computing components with a particular level of trust and/or a particular value assigned to the computing component.

The method 100 can include establishing a plurality of security levels. Each of the plurality of security levels can include a particular execution procedure for computing components that are designated to each of the plurality of security levels. Each security level can define a maximum level of privilege for computing components designated to a corresponding security level. The computing components can interact with other computing components a various security levels. The interactions between various computing components can be based on the security level designated to the computing components. For example, each security level can include a maximum level of privilege for computing components by allowing the computing components designated to a particular security level to interact with other computing components that are also designated to the particular security level. That is, a particular computing component designated to a first security level can interact with other computing components that are also designated to the first security level. In some embodiments, the computing component that is designated to the first security level can also interact with computing components designated to lower security levels (e.g., security levels with a lower maximum levels of privilege).

In some embodiments, the designated security level of a computing component can be altered to a different security level. The altered security level can include an increased maximum level of privilege or a reduced maximum level of privilege for a particular computing component. For example, a computing component can be designated to a first level of security based on the source of the computing component. In this example, the security level can be altered from the first level of security to a second level of security that includes a greater maximum level of privilege compared to the first level of security. Altering to a greater maximum level of privilege is a "trust promotion". In another example, the security level can be altered from the first level of security to a second level of security that includes a reduced maximum level of privilege compared to the first level of security. The altering to a reduced maximum level of privilege is a "trust demotion".

In some embodiments the method 100 can include setting a limit of security level alteration. Setting a limit of security level alteration can include designating a number of security levels that a particular computing component may not access. For example, a particular computing component may not be allowed to be altered into the prohibited security level. In some examples the prohibited security levels can include a security level that includes: hardware of the controller, firmware of the controller, operating system of the controller, and/or core services of the controller. By setting a limit of security level alteration can protect features of the controller by not allowing received computing components access to the protected features.

The method 100 can implemented to provide security of an open architecture platform on a controller. As described herein, the method 100 includes a genetic way of providing security of an open architecture platform on the controller. That is, the method 100 can provide an internal security structure for a controller that is managing a network and utilizing an open platform architecture. As described herein, identifying a source of communication received at the controller and determining a security level of the communication based on the source of the communication can be utilized to provide security for the controller.

Figure 2:
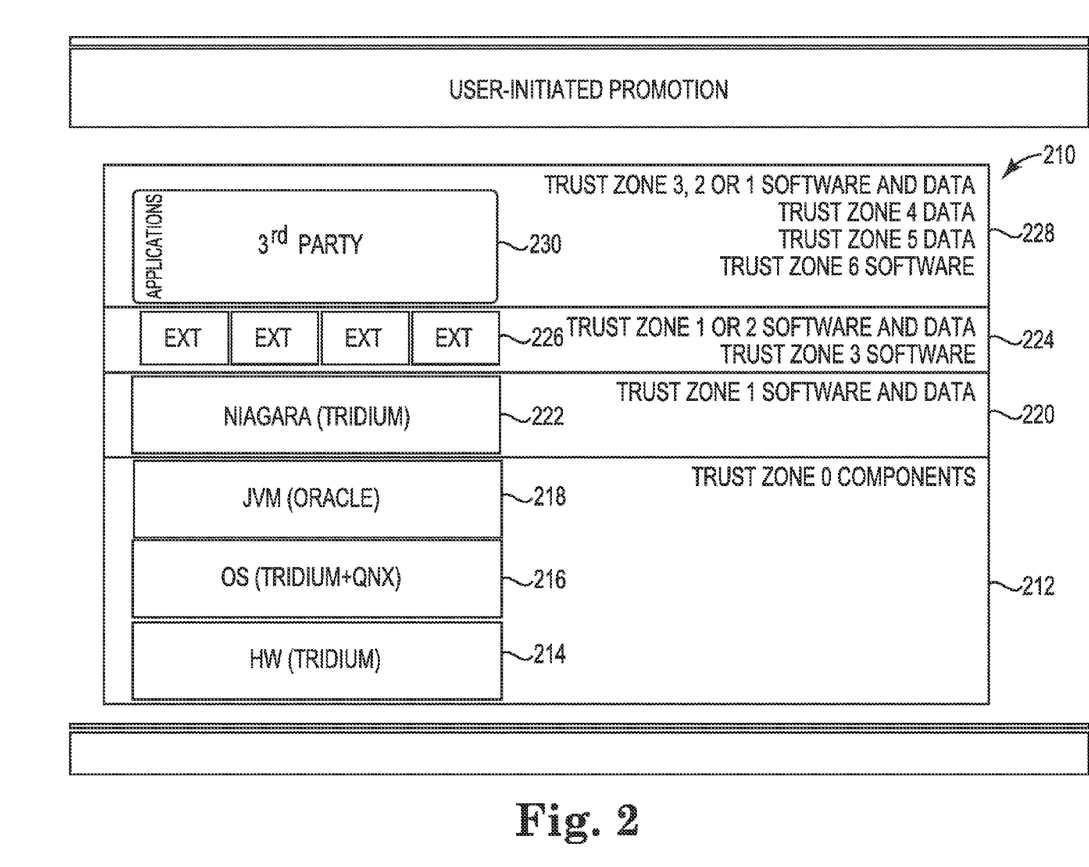
FIG. 2 is an example of a security structure for open architecture security according to one or more embodiments of the present disclosure.

FIG. 2 is an example of a security structure 210 for open architecture security according to one or more embodiments of the present disclosure. The security structure 210 can be implemented on a controller as described herein. A generic way (e.g., internal to the controller) of providing security for an open source architecture can be performed by implementing the security structure 210 on the controller.

The security structure 210 can include a number of security levels (e.g., trust zones, sandboxes, etc.) that are established for a particular controller and/or system. The number of security levels can include a security level zero 212, a security level one 220, a security level two/three 224, and/or a security level four/five/six 228.

Each of the number of security levels can include a maximum level of privilege during run time for computing components that are designated to each of the number of security levels. For example, computing components designated to security level 228 can have a maximum level of privilege during run time that corresponds to security level 228. In some embodiments, the maximum level of privilege during run time can include other computing components that are designated to the same security level. For example, a first computing component can be in the same security level 228 as a second computing component. In this example, the maximum level of privilege can include privileges that allow the first computing component to access the second computing component since they are in the same designated security level 228.

The maximum level of privilege during run time can include designating privilege to computing components that includes privilege to interact with computing components that are designated to different security levels. In some embodiments, a security level can designate a number of other security levels that are accessible to computing components designated to the security level. For example, hardware 214 can be designated to security level 212. In this example, the maximum level of privilege for security level 212 can include access to computing components within security level 220. In some embodiments, the maximum level of privilege for each security level can include access to computing components within the same security level and computing components within security levels that include a more restricted maximum level of privilege. For example, security level 228 can have a more restricted maximum level compared to security level 224. In this example, computing components designated to security level 224 can access other computing components designated to security level 224 and computing components designated to security level 228.

Within each of the plurality of security levels can include a number of trust zones that can be utilized to categorize computing components. For example, computing components within security level 228 can be categorized into a trust zone 4, a trust zone 5, and/or a trust zone 6. Including a number of trust zones within each of the plurality of security levels can add additional granularity when categorizing each of the number of computing components.

In some embodiments, there can be restricted security levels. For example, security level 212 can include trust zone 0 components such as hardware, operating system, and/or virtual machines. In this example, security level 212 can be a restricted security level and other computing components (e.g., received computing components, non-essential computing components, etc.) may not be designated into security level 212.

As described herein, the designated security level of computing components can be altered. For example, a received computing component can be designated to a first security level based on the source of the received computing component. In this example, the received computing component can be altered from the first security level to a second security level. As described herein, computing components may not be able to be altered to a security level that is designated as a restricted security level. For example, a third party application 230 from security level 228 may not be allowed to be altered to security level 212 when security level 212 is a restricted security level.

In some embodiments, each of the trust zones within each of the security levels can comprise particular computing components. For example, in some embodiments, the trust zone 0 within security level 212 can include, but is not limited to: hardware that is designated as genuine hardware (e.g., validated using features of the hardware, etc.), an operating system, hardware that is validated by the operating system, among other computing components.

In another example, in some embodiments, the trust zone 1 within security level 220 can include software and/or data that are authored by a particular developer. In one embodiment, the particular developer can include software and/or data authored and/or developed by Tridium® (e.g., Niagara 222). Furthermore, in some embodiments, trust zone 2 within security level 224 can include software and/or data from trusted sources that can be verified and/or validated by the controller. For example, the software and/or data within trust zone 2 can include software and/or data received by Tridium®. The source can be validated via a certificate and/or third party certificate that is associated with the software and/or data.

In addition, in some embodiments, trust zone 3 within security level 224 can include software and/or data from a number of sources that can be verified. The number of sources may not include a trusted source, but the number of sources can be verified via a certificate and/or third party certificate that is associated with the software and/or data. In addition, in some embodiments, trust zone 4 within security level 228 can include data that is received from a number of physically connected sources. Physically connected sources can include sources that are transferring data via a physical connection.

Furthermore, in some embodiments, trust zone 5 within security level 228 can include data that is received from a number of remote sources. Remotely connected sources can include sources that are transferring data via a wireless connection (e.g., WIFI, etc.) and/or network connection (e.g., local area network (LAN), wide area network (WAN), Internet, etc.), wherein the data from the remote sources are not authenticated. Data from remote sources that is not authenticated can include data that is not authenticated utilizing a key associated with a certificate. Data that is not authenticated can be a relatively high risk for a cyber-threat attack since this type of data can include a source name, but it can be a different user utilizing the name since the data is not authenticated. Lastly, in some embodiments, trust zone 6 within security level 228 can include software that is received from a third party that is not authenticated. That is, trust zone 6 can include software that is downloaded from a network and the software is unsigned by a developer and is not associated with a certificate.

In some embodiments, software and/or data from trust zone 3, trust zone 4, trust zone 5, and/or trust zone 6 may not be privileged to access secure information of the controller. In some embodiments, the software and/or data that is designated to these trust zones may not be altered to a different security level. For example, if a received computing component is designated to trust zone 4 within security level 228, the received computing component may be restricted from being designated to security level 224 and/or other security levels other than security level 228.

As described herein, the security structure 210 can be implemented on a controller to provide the controller with open architecture platform security. As described herein, providing a controller that is utilizing an open architecture platform can be difficult since there are multiple users that can be communicating with the controller simultaneously. In order to provide a robust security platform that is implemented in the controller the security structure 210 and/or the method 100 as referenced in FIG. 1 can be utilized.

Figure 3:
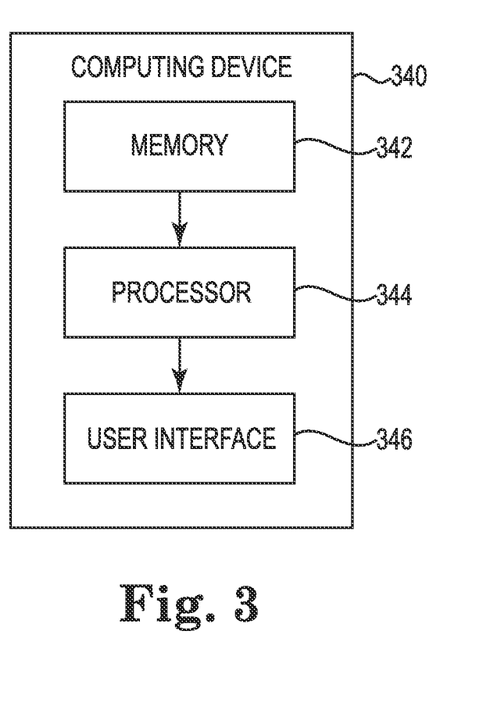
FIG. 3 is an example of a diagram of a device for open architecture security according to one or more embodiments of the present disclosure.

FIG. 3 is an example of a diagram of a device for open architecture security according to one or more embodiments of the present disclosure. Computing device 340 can be, for example, a network controller as described herein, among other types of computing devices.

As shown in FIG. 3, computing device 340 includes a memory 342 and a processor 344 coupled to memory 342. Memory 342 can be any type of storage medium that can be accessed by processor 344 to perform various examples of the present disclosure. For example, memory 342 can be a non-transitory computer readable medium having computer readable instructions (e.g., computer program instructions) stored thereon that are executable by processor 344 to determine a deployment of an access control system in accordance with one or more embodiments of the present disclosure.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can also be located internal to another computing resource (e.g., enabling computer readable instructions to be downloaded over the Internet or another wired or wireless connection).

As shown in FIG. 3, computing device 340 can also include a user interface 346. User interface 346 can include, for example, a display (e.g., a screen). The display can be, for instance, a touch-screen (e.g., the display can include touch-screen capabilities). User interface 346 (e.g., the display of user interface 346) can provide (e.g., display and/or present) information to a user of computing device 340.

Additionally, computing device 340 can receive information from the user of computing device 340 through an interaction with the user via user interface 346. For example, computing device 340 (e.g., the display of user interface 346) can receive input from the user via user interface 346. The user can enter the input into computing device 340 using, for instance, a mouse and/or keyboard associated with computing device 340, or by touching the display of user interface 346 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for open architecture security in a system, comprising:
configuring a controller in the system to comprise a memory and a processor configured to execute executable instructions stored in the memory for:
identifying a source of a received computing component at the controller, wherein the received computing component requests access to a number of specific computing resources in the system;
assigning a value to the received computing component based on the source;
designating the received computing component into a security level from a plurality of security levels based on the assigned value, wherein the plurality of security levels includes security level includes a restricted security level that includes a maximum level of privilege for firmware, hardware, and core services of the system, and wherein the designated security level is different than the restricted security level;
determining a number of specific computing resources the computing component can access during run time based on the designated security level for the received computing component, wherein the specific computing resources include hardware and an operating system of the system; and
allow access to a portion of the requested number of the specific computing resources from the received computing component based on the designated security level for the received computing component.

2. The method of claim 1, wherein identifying the source includes identifying an author of the received computing component.

3. The method of claim 1, wherein identifying the source includes identifying a signature of the received computing component.

4. The method of claim 1, wherein designating the received computing component into a security level includes designating an execution procedure for the computing component during run time.

5. The method of claim 1, wherein the number of specific computing resources includes a maximum level of resources the computing component can access during run time.

6. The method of claim 1, wherein the designated computing component is altered to a different security level.

7. A non-transitory computer readable medium, comprising stored instructions executable by a processor of a controller configured to:
identify a source of a received computing component, wherein the received computing component requests access to a number of specific computing resources in a system;

designate the received computing component into a security level from a plurality of security levels based on the source of the received computing component, wherein the plurality of security levels include security level includes a restricted security level that includes a maximum level of privilege for firmware, hardware, and core services of the system, and wherein the designated security level is different than the restricted security level; and allow access to a portion of the requested number of specific computing resources based on the designated security level for the received computing component, wherein the requested number of specific computing resources includes hardware and an operating system of the system.

8. The non-transitory computer readable medium of claim 7, wherein the security level comprises a maximum level of privilege for the received computing component during run time.

9. The non-transitory computer readable medium of claim 7, comprising instructions to receive a request to alter the designated security level.

10. The non-transitory computer readable medium of claim 9, wherein the request to alter the designated security level includes a security level increase maximum.

11. The non-transitory computer readable medium of claim 7, comprising instructions to set a limit of security level alteration.

12. The non-transitory computer readable medium of claim 7, wherein the instructions to identify a source include instructions to authenticate the source of the received computing resource.

13. A controller, comprising:
a memory in a system; and
a processor in the system configured to execute executable instructions stored in the memory to:
establish a number of security levels for a plurality of computing components of the system, wherein a restricted security level of the number of security levels defines a maximum level of privilege for firmware, hardware, and core services of the system;
identify a source of a received computing component;
designate the received computing component into a security level from the number of security levels based on the source, wherein the designated security level for the received computing component is different than the restricted security level; and
allow access to a portion of a requested number of specific computing resources from the received computing component based on the designated security level for the received computing component, wherein the requested number of specific computing resources includes hardware and an operating system of the system.

14. The controller of claim 13, wherein the received computing component is not allowed to be designated to the number of restricted security levels.

15. The controller of claim 13, wherein the received computing component is not allowed to be altered to the number of restricted security levels.

16. The controller of claim 13, comprising instructions to alter the designated security level of the received computing component to a more restricted security level than the designated security level.

* * * * *